United States Patent
Horng et al.

(10) Patent No.: US 6,789,992 B2
(45) Date of Patent: Sep. 14, 2004

(54) WASHER HAVING OIL-BEARING HOLES

(75) Inventors: Alex Horng, Kaohsiung (TW);
Yin-Rong Hong, Kaohsiung (TW);
Ching-Sheng Hong, Kaohsiung (TW)

(73) Assignee: Sunonwealth Electric Machine Industry Co., Ltd., Koahsiung (TW)

( * ) Notice: Subject to any disclaimer, the term of this patent is extended or adjusted under 35 U.S.C. 154(b) by 1 day.

(21) Appl. No.: 10/247,489

(22) Filed: Sep. 20, 2002

(65) Prior Publication Data

US 2004/0057813 A1 Mar. 25, 2004

(51) Int. Cl.[7] .................... F16B 43/00; F16C 32/06
(52) U.S. Cl. .................. 411/534; 411/531; 384/121; 384/420
(58) Field of Search ................. 411/531, 534, 411/545; 384/121, 123, 420, 425

(56) References Cited

U.S. PATENT DOCUMENTS

| | | | | |
|---|---|---|---|---|
| 4,875,787 A | * | 10/1989 | Bauer et al. | 384/548 |
| 5,033,937 A | * | 7/1991 | Wilson | 475/170.1 |
| 5,106,342 A | * | 4/1992 | Fisher | 464/432 |
| 6,264,566 B1 | * | 7/2001 | Nieman et al. | 464/132 |
| 6,336,868 B1 | * | 1/2002 | Kurecka et al. | 464/134 |
| 6,592,490 B2 | * | 7/2003 | Olson | 475/331 |

OTHER PUBLICATIONS

U.S. patent application Publication US 2001/0005436 A1, Sjostrom et al., Jun. 2001.*

U.S. patent application Publication US 2003/0016891 A1, Gomyo et al., Jan. 2003.*

* cited by examiner

Primary Examiner—Robert J. Sandy
Assistant Examiner—Ruth C. Rodriguez
(74) Attorney, Agent, or Firm—Bacon & Thomas, PLLC

(57) ABSTRACT

A washer in accordance with the present invention comprises an axial hole and a plurality of oil-bearing portions. The oil-bearing portions are located on an inner surface opposite to an outer surface and surround the axial hole.

10 Claims, 6 Drawing Sheets

WASHER HAVING OIL-BEARING HOLES

BACKGROUND OF THE INVENTION

1. Field of the Invention

The present invention is related to a washer having oil-bearing portions and more particularly to a washer applied to an end surface of a sleeve bearing, so that the oil-bearing portions may reservoir oil to thereby increase the rotational efficiency of a shaft received in the sleeve bearing.

2. Description of the Related Art

A conventional washer is applied to prevent a fan wheel from contacting with other motor members and a sleeve bearing to thereby reduce abrasion therebetween. Nevertheless, the singular function of the conventional washer is merely capable of preventing the fan wheel from contacting with other motor members. In addition, the conventional washer is rotated by rotation of the fan wheel and thus results in a specific abrasion with an end surface of the oil-pregnant bearing. Consequently, there is a need for a reduction of the abrasion of the bearing.

The inner lubricant of a conventional sleeve bearing may be leaked automatically or forced to leak by a rotating shaft after long-term use. Accordingly, the lubricity of the inside of the bearing is reduced gradually that the bearing results in a relative decrease in the rotational efficiency of a shaft received therein. A specific leakage of the inner lubricant occurs in the ends of the bearing. Consequently, there is a need for an additional member to prevent the bearing from the leakage.

In order to attenuate the lubricant leakage on the end surface of the bearing, the bearing is provided with an oil-circulated manner. To this end, the leakage of the outer lubricant is guided into the inside of the bearing through a guiding groove. However, the leakage of the outer lubricant from the bearing must reservoir on the end surface of the bearing for a while. On the one hand it can avoid the lubricant leakage, and on the other hand it can reduce an abrasion between the washer and the end surface of the bearing. For instance, both of an increase of lubricant layer and a decrease of the total contact area between the washer and the end surface of the bearing is capable of reducing the abrasion.

The present invention intends to provide a washer having oil-bearing portions provided on an inner surface to thereby guide the lubricant leaking from a bearing to form a lubricant layer on the end surface of the bearing in such a way to mitigate and overcome the above problem.

SUMMARY OF THE INVENTION

The primary objective of this invention is to provide a washer having oil-bearing portions which is provided on an inner surface to thereby reduce a total contact area between the inner surface of the washer and an end surface of a bearing for attenuating the abrasion.

The secondary objective of this invention is to provide the washer having oil-bearing portions which guide the lubricant leaking from a bearing to form a lubricant layer on an end surface of the bearing for increasing the lubricity.

The washer in accordance with the present invention mainly comprises an axial hole and a plurality of oil-bearing portions. The oil-bearing portions are located on an inner surface opposite to an outer surface and surround the axial hole.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
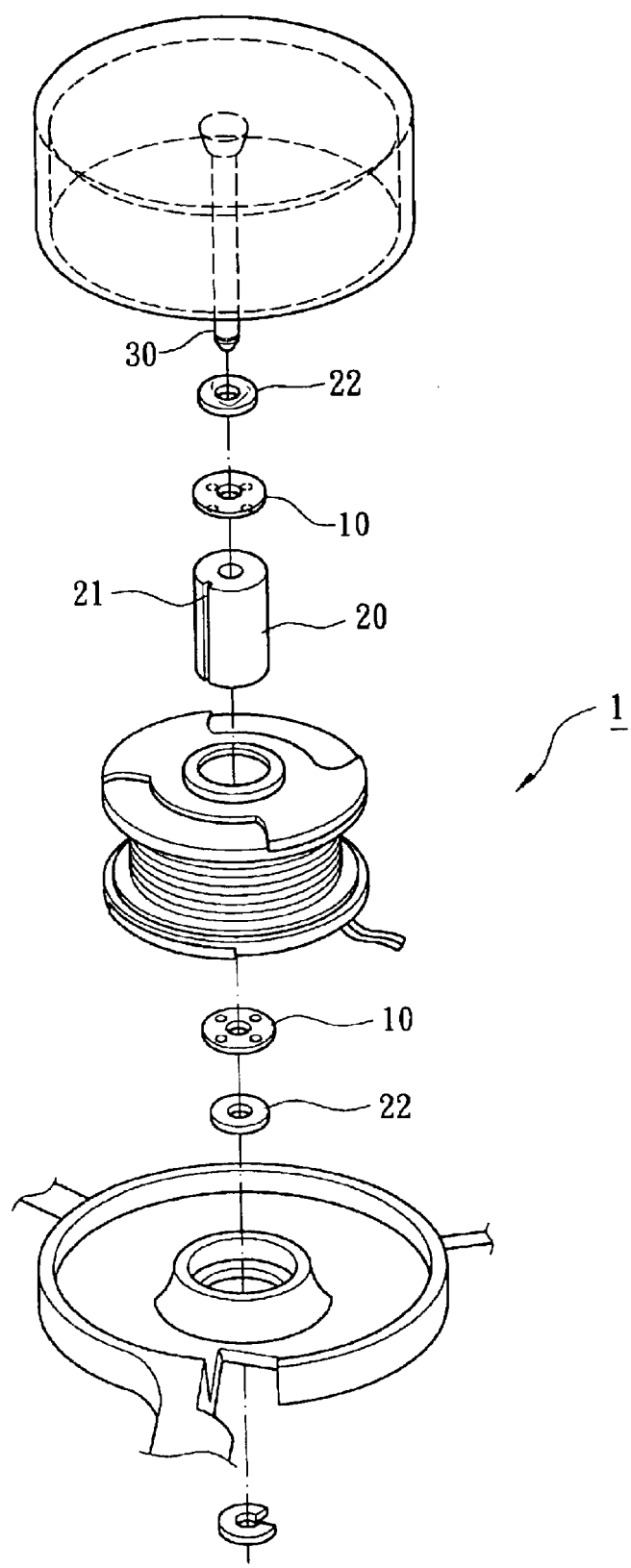
FIG. 1 is a perspective view of a washer having oil-bearing portions assembling in a motor in accordance with a first embodiment of the present invention.

Referring now to the drawings, there are seven embodiments of the present invention shown therein, all of which include generally a primary washer member and a secondary motor member.

Figure 2:
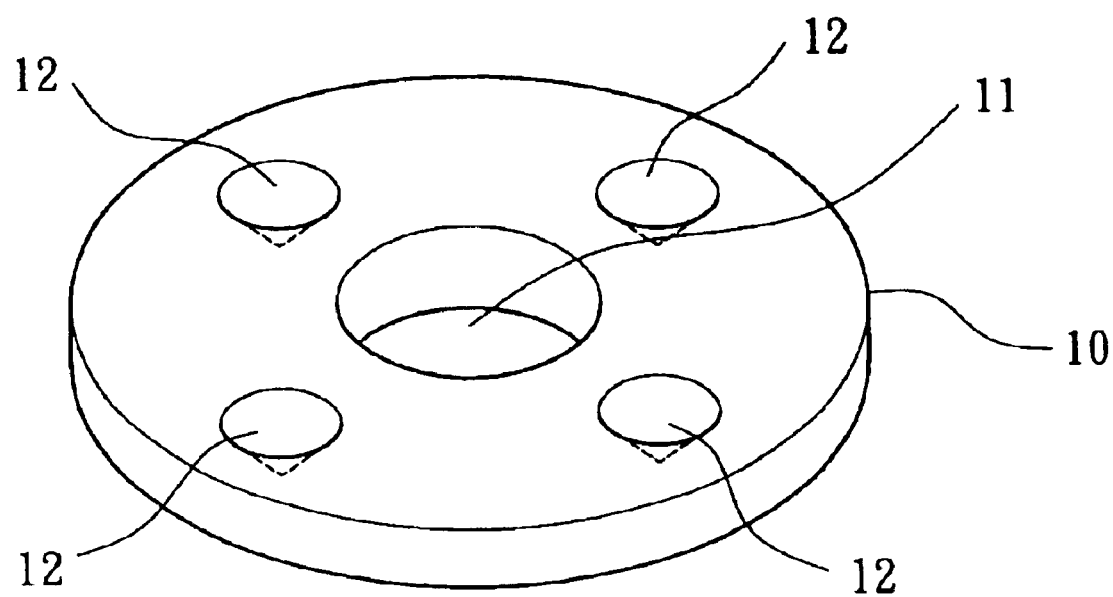
FIG. 2 is a perspective view of a washer having oil-bearing portions in accordance with the first embodiment of the present invention.

Referring initially to FIGS. 1 and 2, a motor designated as numeral 1 includes a washer designated as numeral 10, a sleeve bearing designated as numeral 20, an elastic member designated as numeral 22, and a shaft designated as numeral 30. The washer 10 is a circle plate with a predetermined thickness. In assembling, the washer 10 is sandwiched in between an end surface of the sleeve bearing 20 and the elastic member 22. The washer 10, the sleeve bearing 20, and the elastic member 22 are axially nested in the motor 1.

The term "inner surface", as used herein, means a surface of the washer 10 adjacent to a surface of the sleeve bearing 20. Similarly, the term "outer surface", as used herein, means a surface of the washer 10 opposite to the inner surface adjacent to the sleeve bearing 20.

Construction of the washer 10 shall be described in detail, referring again to FIG. 2. The washer 10 in accordance with a first embodiment of the present invention includes an axial hole 11, and a plurality of oil-bearing portions 12. The axial hole 11 connects an outer surface to an inner surface. The oil-bearing portions 12 are recessions provided on the inner surface and surround an outer periphery of the axial hole 11.

Figure 3:
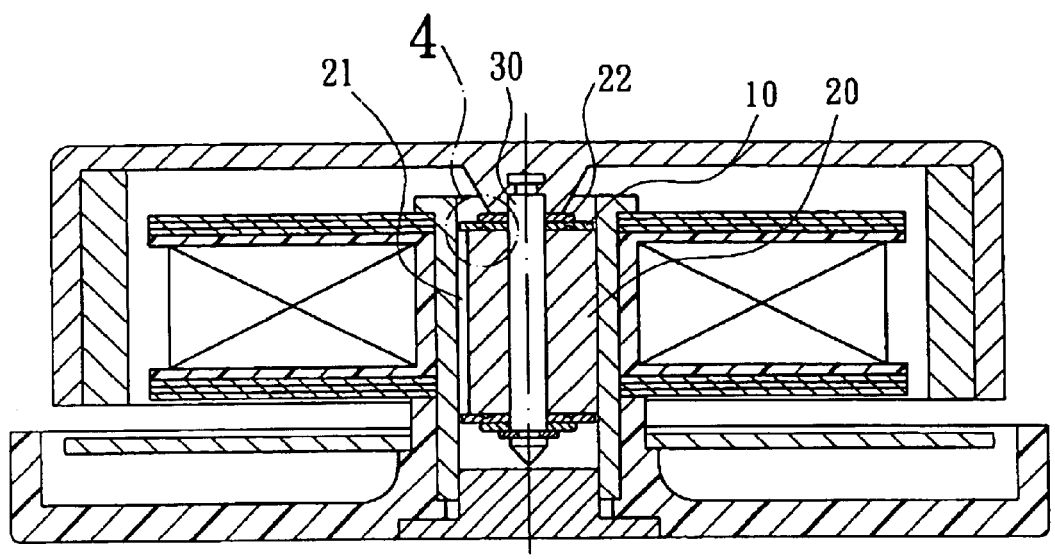
FIG. 3 is a sectional view of the washer having oil-bearing portions assembled in the motor in accordance with the first embodiment of the present invention.
Figure 4:
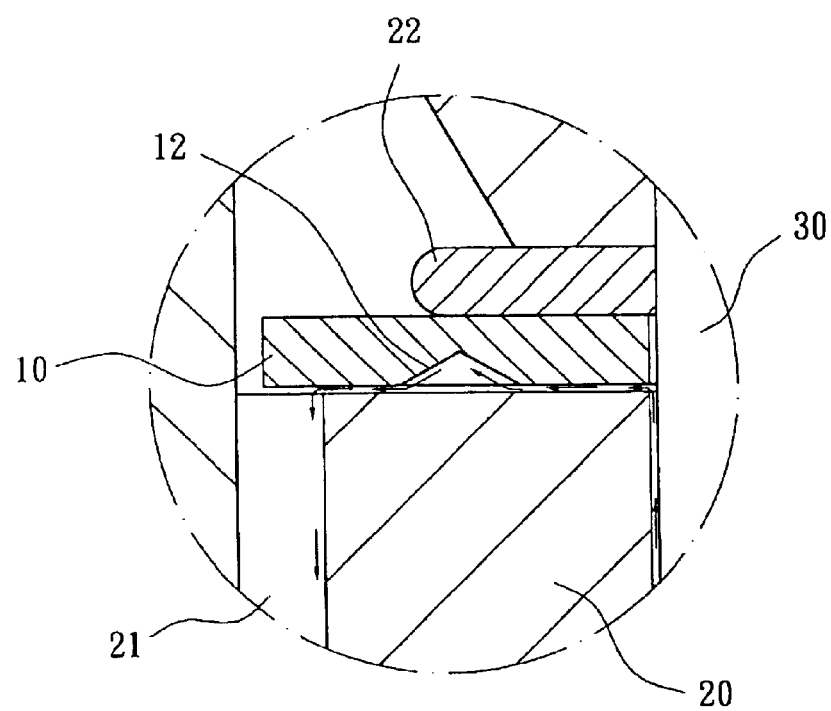
FIG. 4 is an enlarged partial view in FIG. 3 of the washer having oil-bearing portions in accordance with the first embodiment of the present invention.

Assembling the washer 10 in the motor 1 shall now be described with reference to FIGS. 3 and 4. The outer surface of the washer 10 is confronted with a surface of the elastic member 22 while the inner surface of the washer 10 is confronted with an end surface of the sleeve bearing 20. The oil-bearing portions 12 round the outer periphery of the axial hole 11 are adapted to collect the leakage lubricant from the sleeve bearing 20. Subsequently, the leakage lubricant in the oil-bearing portions 12 may form a lubricant layer between the inner surface of the washer 10 and the end surface of the sleeve bearing 20. The sleeve bearing 20 further comprises a circulating groove 21 for circulating the leakage lubricant collected in the oil-bearing portions 12.

Referring back to FIG. 4, when the shaft 30 is rotated in the sleeve bearing 20, the inner lubricant of the sleeve bearing 20 may leak along the shaft 30 and the leakage lubricant may return to the sleeve bearing 20 in direction of the arrows. On the one hand, the leakage lubricant may flow into a gap between the inner surface of the washer 10 and the end surface of the sleeve bearing 20 and collect in the oil-bearing portions 12 to thereby perform buoyancy. On the other hand, the total contact area between the inner surface of the washer 10 and the end surface of the sleeve bearing 20 may be reduced due to the oil-bearing portions 12. Consequently, both of the collecting lubricant layer and the reduced contact area between the washer 10 and the sleeve bearing 20 may result in an increase of the rotational efficiency of the shaft 30.

Figure 5:
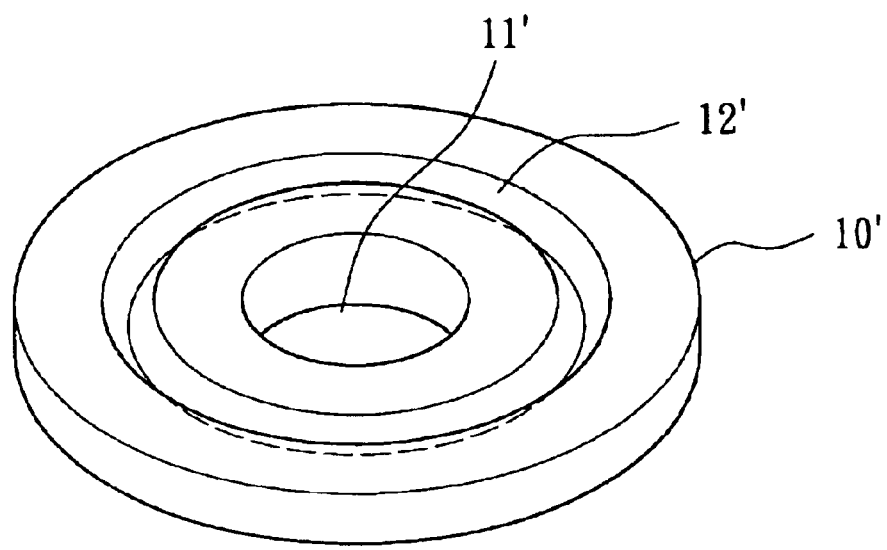
FIG. 5 is a perspective view of a washer having oil-bearing portions in accordance with a second embodiment of the present invention.

Referring to FIGS. 5 through 6, reference numerals of second through fifth embodiments have applied the identical numerals of the first embodiment. The washer 10, the sleeve bearing 20, and the shaft 30 of the second through fifth embodiments have the similar configuration and same function as the first embodiment and the detailed descriptions are omitted.

Referring to FIG. 5, the washer 10' in accordance with the second embodiment of the present invention includes an axial hole 11', and an oil-bearing portion 12'. The axial hole 11' connects an outer surface to an inner surface. The oil-bearing portion 12' is an annular groove provided on the inner surface and surround an outer periphery of the axial hole 11'.

Figure 6A:
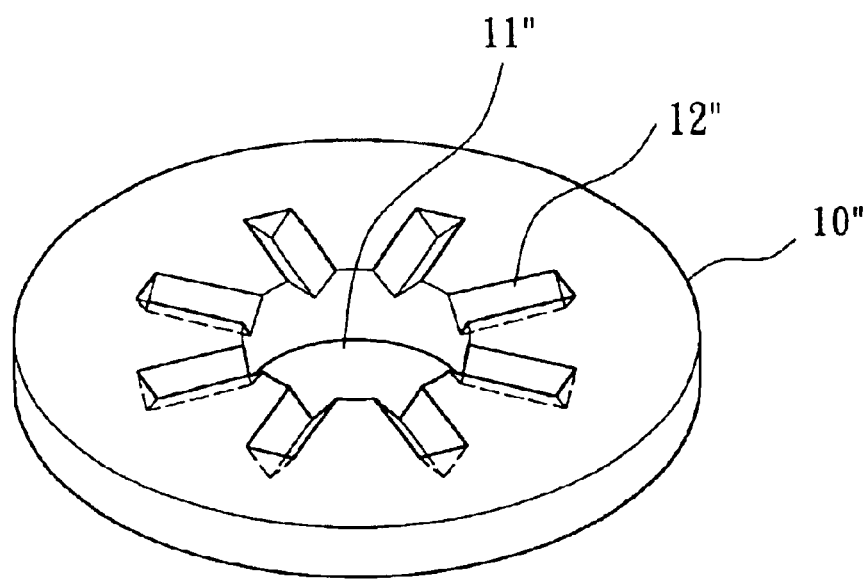
FIG. 6A is a perspective view of a washer having oil-bearing portions in accordance with a third embodiment of the present invention.
Figure 6B:
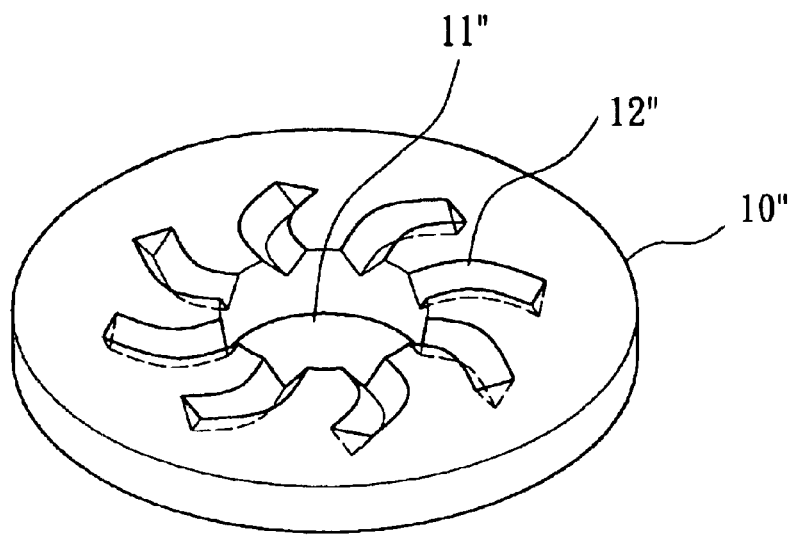
FIG. 6B is a perspective view of a washer having oil-bearing portions in accordance with a fourth embodiment of the present invention.
Figure 6C:
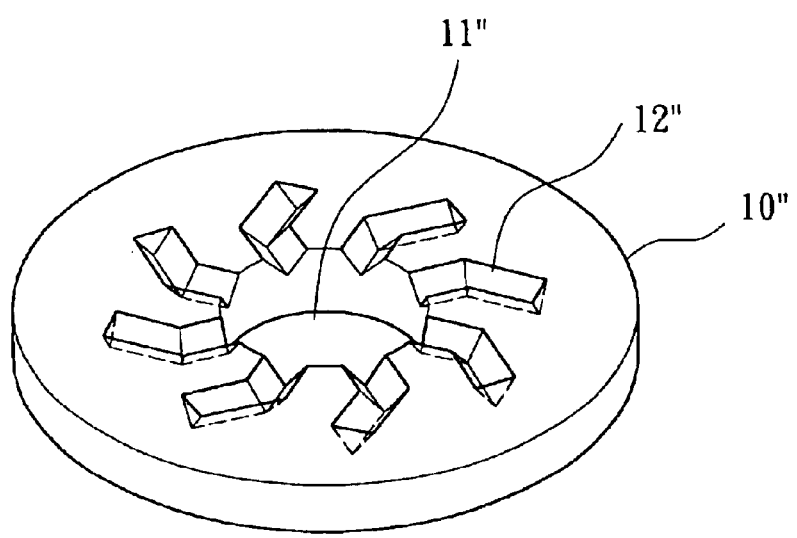
FIG. 6C is a perspective view of a washer having oil-bearing portions in accordance with a fifth embodiment of the present invention.

Referring to FIGS. 6A through 6C, the washer 10" in accordance with the third through fifth embodiments of the present invention includes an axial hole 11", and a plurality of oil-bearing portions 12". The axial hole 11" connects an outer surface to an inner surface. The oil-bearing portions 12" are radial grooves provided on the inner surface. The oil-bearing portions 12" may be extended to an edge of the axial hole 12" while surrounding an outer periphery of the axial hole 11". Preferably, the radial groove of the oil-bearing portion 12" is straight, as shown in FIG. 6A, curved, as shown in FIG. 6B, comprised of a bent point midway between two ends, as shown in FIG. 6C.

Figure 7:
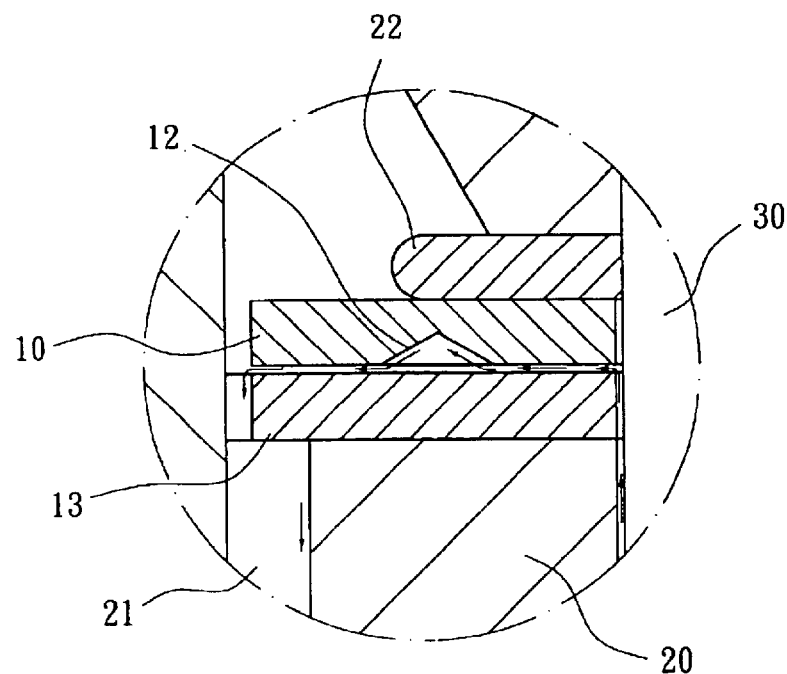
FIG. 7 is an enlarged partial view a washer having oil-bearing portions combined with an auxiliary washer in accordance with a sixth embodiment of the present invention.
Figure 8:
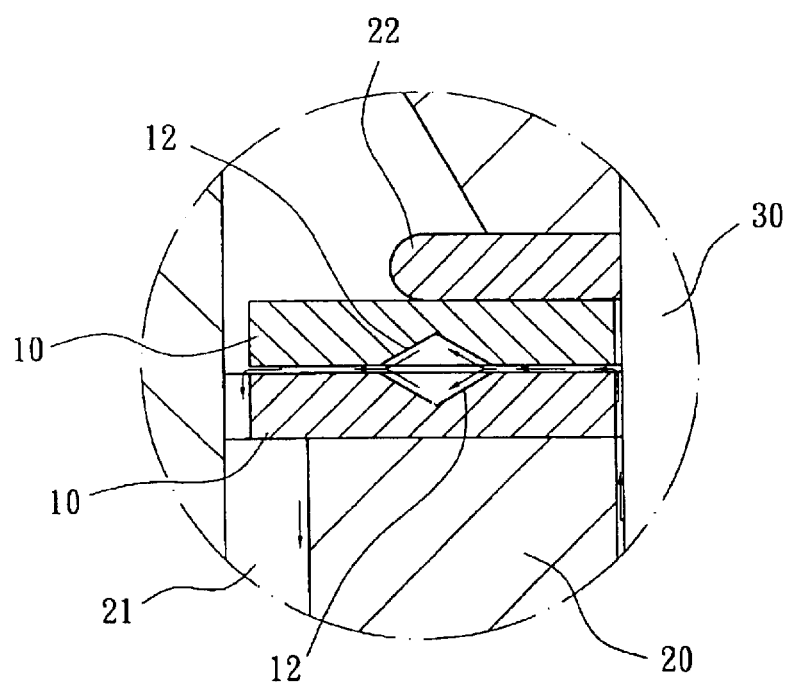
FIG. 8 is an enlarged partial view a washer having oil-bearing portions combined with an auxiliary washer in accordance with a seventh embodiment of the present invention.

Referring to FIGS. 7 and 8, reference numerals of seventh and eighth embodiments have applied the identical numerals of the first embodiment. The washer 10, the sleeve bearing 20, and the shaft 30 of the seventh and eighth embodiments have the similar configuration and same function as the first embodiment and the detailed descriptions are omitted.

Referring to FIG. 7, a washer assembly includes a first washer corresponding to the above-described washer 10 and, in accordance with the seventh embodiment of the present invention, further includes an auxiliary washer 13 which is capable of reducing abrasion. The leakage lubricant may flow into a gap between the inner surface of the first washer 10 and a surface of the auxiliary washer 13 and collect in the oil-bearing portions 12 to thereby perform provide buoyancy.

Referring to FIG. 8, the washer in accordance with the eighth embodiment of the present invention is comprised of a pair of washers 10 whose oil-bearing portions are confronted with each other. The leakage lubricant may flow into a gap between the washers 10 and collects in the oil-bearing portions 12 to thereby perform buoyancy.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A washer assembly applied to an end surface of a bearing, wherein said bearing is adapted to rotatably support a shaft, said washer assembly comprising:
   a first washer including an inner surface that faces said bearing and an outer surface, the first washer comprising:
      an axial hole connecting the outer surface to the inner surface of the first washer, and adapted to receive the shaft; and
      at least one oil-bearing portion provided on the inner surface of the first washer for preventing leakage of lubricant from the bearing and corresponding to an outer periphery of the axial hole; and
   an auxiliary washer adapted to reduce abrasion between the washer and the bearing, said auxiliary washer facing the oil-bearing portion of the washer to prevent lubricant contained in the oil-bearing portion of the washer from running dry,
   wherein when the shaft is rotated, leakage lubricant from the bearing may flow into a gap between the inner surface of the washer and the end surface of the bearing, and collects in the oil-bearing portion.

2. The washer assembly as defined in claim 1, further comprising an elastic member, the washer assembly being sandwiched in between the elastic member and the bearing.

3. The washer assembly as defined in claim 1, wherein the washer assembly is comprised of a pair of washers whose oil-bearing portions confront each other.

4. The washer assembly as defined in claim 1, wherein the oil-bearing portion is a recession.

5. The washer assembly as defined in claim 1, wherein the oil-bearing portion is an annular groove.

6. The washer assembly as defined in claim 1, wherein the oil-bearing portion is a radial groove.

7. The washer assembly as defined in claim 6, wherein the radial groove is straight.

8. The washer assembly as defined in claim 6, wherein the radial groove is curved.

9. The washer assembly as defined in claim 6, wherein the radial groove is comprised of a bent point.

10. The washer assembly as defined in claim 6, wherein the radial groove extends to an edge of the axial hole.

* * * * *

UNITED STATES PATENT AND TRADEMARK OFFICE
CERTIFICATE OF CORRECTION

PATENT NO. : 6,789,992 B2 Page 1 of 1
DATED : September 14, 2004
INVENTOR(S) : Alex Horng, Yin-Rong and Ching-Sheng Hong It is certified that error appears in the above-identified patent and that said Letters Patent is hereby corrected as shown below:

<u>Title page,</u>
Item [54], Title, change "WASHER HAVING OIL-BEARING HOLES" to
-- WASHER HAVING OIL-BEARING PORTIONS --.

Signed and Sealed this

Eighth Day of March, 2005

JON W. DUDAS
*Director of the United States Patent and Trademark Office*